US009323348B2

(12) United States Patent
Nungester et al.

(10) Patent No.: US 9,323,348 B2
(45) Date of Patent: Apr. 26, 2016

(54) STYLUS HAVING SENSING AND TRANSMITTING CAPABILITIES

(71) Applicant: Crayola LLC, Easton, PA (US)

(72) Inventors: Gregory R. Nungester, Asbury, NJ (US); Rafael Feliciano, Scotch Plains, NH (US)

(73) Assignee: CRAYOLA LLC, Easton, PA (US)

( * ) Notice: Subject to any disclaimer, the term of this patent is extended or adjusted under 35 U.S.C. 154(b) by 84 days.

(21) Appl. No.: 13/671,974

(22) Filed: Nov. 8, 2012

(65) Prior Publication Data
US 2013/0113763 A1    May 9, 2013

Related U.S. Application Data

(60) Provisional application No. 61/557,591, filed on Nov. 9, 2011.

(51) Int. Cl.
*G06F 3/033* (2013.01)
*G06F 3/041* (2006.01)
*G06F 3/0354* (2013.01)

(52) U.S. Cl.
CPC ............ *G06F 3/033* (2013.01); *G06F 3/03545* (2013.01)

(58) Field of Classification Search
USPC .......................................... 345/173, 174, 179
See application file for complete search history.

(56) References Cited

U.S. PATENT DOCUMENTS

| 5,007,085 A | 4/1991 | Greanias |
| 5,828,360 A * | 10/1998 | Anderson ............ G06F 3/03545 345/902 |
| 6,100,538 A * | 8/2000 | Ogawa ...................... 250/559.29 |
| 6,441,810 B1 * | 8/2002 | Skoog et al. .................. 345/179 |
| 6,539,101 B1 * | 3/2003 | Black ............................ 382/124 |
| 2002/0136587 A1 * | 9/2002 | Bramlett et al. ................ 401/17 |
| 2003/0214490 A1 * | 11/2003 | Cool ............................. 345/179 |
| 2007/0188478 A1 | 8/2007 | Silverstein |
| 2008/0156546 A1 | 7/2008 | Hauck |
| 2009/0153526 A1 | 6/2009 | Blake |
| 2010/0155153 A1 * | 6/2010 | Zachut ........................ 178/18.03 |
| 2011/0310031 A1 * | 12/2011 | Harris et al. ................... 345/173 |
| 2012/0331546 A1 * | 12/2012 | Falkenburg et al. ............ 726/16 |

OTHER PUBLICATIONS

The International Search Report and Written Opinion for PCT/US12/64419; filed Nov. 9, 2012.

* cited by examiner

*Primary Examiner* — Calvin C Ma
(74) *Attorney, Agent, or Firm* — Shook, Hardy & Bacon L.L.P.

(57) ABSTRACT

A drawing stylus that transmits data to a base unit using high-frequency audio or radio frequency signals is described. The stylus includes a color selector that enables a user to select a color to be associated with inputs from the stylus. A pressure sensor is also included to detect a pressure applied to the tip of the stylus. The selected color and pressure data are transmitted over high-frequency audio or radio frequency signals to a base unit for processing. The base unit may use the data received via the transmission along with one or more other data elements as inputs to an application executing on the base unit.

18 Claims, 1 Drawing Sheet

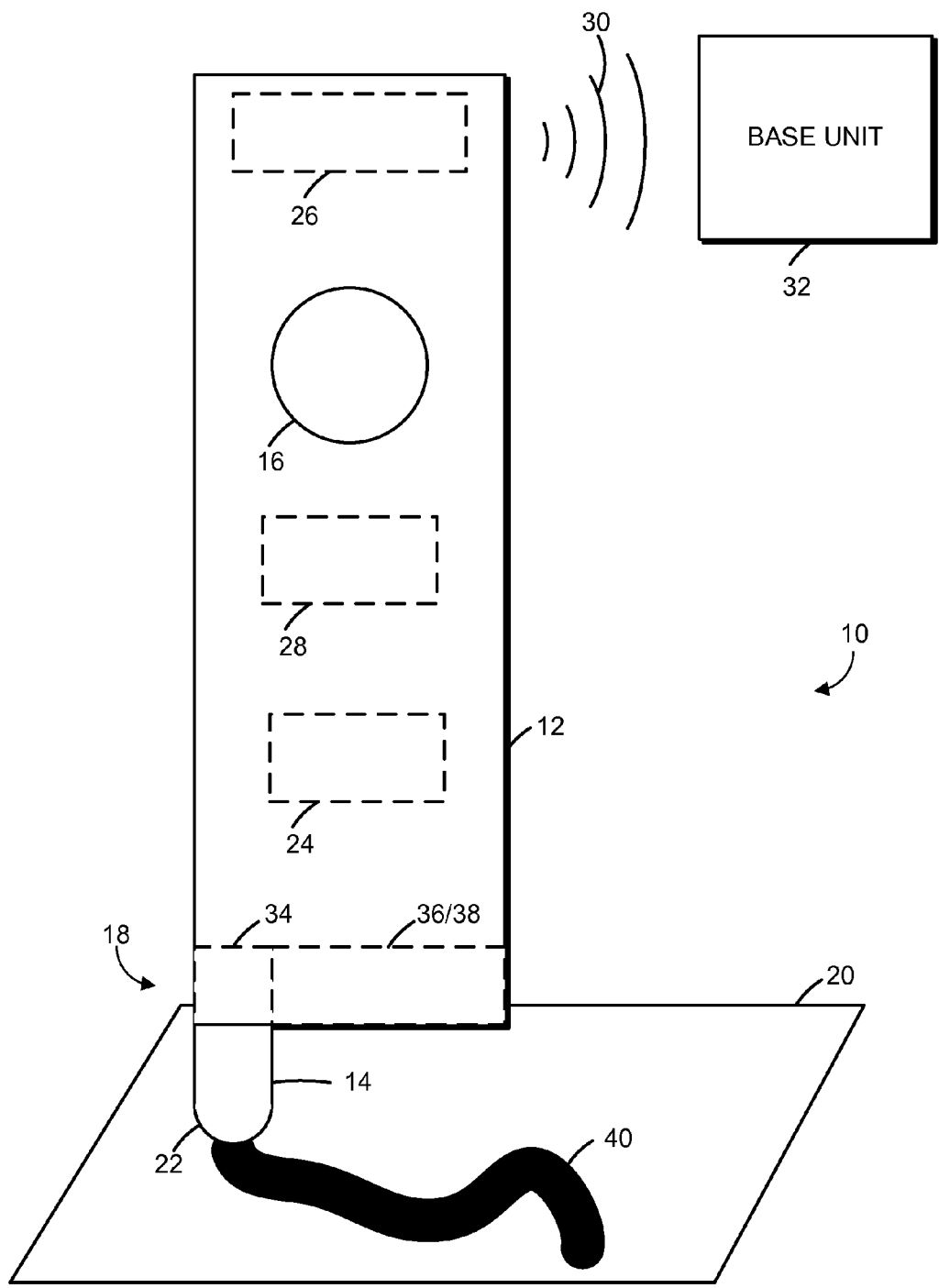

STYLUS HAVING SENSING AND TRANSMITTING CAPABILITIES

CROSS-REFERENCE TO RELATED APPLICATIONS

This application claims priority to U.S. Provisional Patent Application No. 61/557,591, entitled "Stylus," filed Nov. 9, 2011, the disclosure of which is hereby incorporated by reference in its entirety.

SUMMARY

Embodiments of the invention are defined by the claims below, not this summary. A high-level overview of various aspects of the invention are provided here for that reason, to provide an overview of the disclosure, and to introduce a selection of concepts that are further described in the Detailed-Description section below. This summary is not intended to identify key features or essential features of the claimed subject matter, nor is it intended to be used as an aid in isolation to determine the scope of the claimed subject matter. In brief and at a high level, this disclosure describes, among other things, a stylus or input device that transmits data over high-frequency audio or radio signals to a base unit. The stylus may include a pressure sensor for detecting a pressure applied between a tip of the stylus and a surface. A color selection means, such as a switch, dial, or sensor, is provided on the stylus to allow a user to select a color to be drawn in association with movements of the stylus. The base unit receives the transmissions from the stylus and provides appropriate outputs on, for example, a display device. The stylus is thus useable to interact with and to compose drawings that are displayed on a display device associated with a computing device.

In a first embodiment of the invention, a stylus comprises a body; a tip; a sensor configured to provide data comprising one or more of an amount of a pressure applied to the tip and a color in proximity to the tip; a transmitter configured to transmit the data using one or more of high-frequency audio signals and radio frequency signals, wherein the data is transmitted to a base unit comprising a computing device having a receiver; and a processor configured to transmit the data comprising one or more of the pressure and the color to the base unit using the transmitter.

In a second embodiment of the invention, a stylus comprises a body; a tip; a sensor configured to provide data comprising one or more of an amount of a pressure applied to the tip and a color in proximity to the tip; a transmitter configured to transmit the data over the air to a base unit comprising a computing device having a receiver; and a processor configured to transmit the data to the base unit using the transmitter.

A third embodiment of the invention comprises: a body; a tip; a pressure sensor configured to provide data comprising an amount of pressure applied to the tip; a color sensor configured to provide data comprising a color in proximity to the tip, wherein the color sensor comprises a camera configured to capture an image; a color selection means for enabling a user to select a color associated with inputs of the stylus; a transmitter configured to transmit data from one or more of the pressure sensor and the color sensor using high-frequency audio signals, wherein the data comprises one or more of the amount of pressure, the color in proximity to the tip, and a color selected by a user, wherein the transmitter transmits the data to a base unit comprising a computing device having a receiver; and a processor configured to transmit the data to the base unit using the transmitter.

DESCRIPTION OF THE DRAWINGS

The present invention is described in detail below with reference to the attached drawing figures, wherein:

FIG. 1 depicts a stylus in accordance with an embodiment of the invention.

DETAILED DESCRIPTION

The subject matter of select embodiments of the invention is described with specificity herein to meet statutory requirements. But the description itself is not intended to necessarily limit the scope of claims. Rather, the claimed subject matter might be embodied in other ways to include different steps, components, or combinations thereof similar to the ones described in this document, in conjunction with other present or future technologies. Terms should not be interpreted as implying any particular order among or between various steps herein disclosed unless and except when the order of individual steps is explicitly described.

Embodiments of the invention are described herein with respect to a stylus. However, such is not intended to limit embodiments to any particular configuration of an input device as described herein. Further, exemplary materials, components, and methods of manufacture described herein are intended to aid in providing an understanding of embodiments of the invention. They are not intended to limit embodiments of the invention to any particular materials, components, or methods of manufacture unless explicitly stated otherwise.

With reference to FIG. 1, a stylus 10 is described in accordance with an embodiment of the invention. The stylus 10 includes a body 12, a tip 14, and a color selector 16. In one embodiment, the body 12 includes an elongate, hollow, generally cylindrical form that is configured to be held in the hand of a user in a manner similar to a common writing apparatus, e.g. a pen, pencil, crayon, paintbrush, or the like. The body 12 might include one or more surface features (not shown) that provide comfort, grip, or other desired characteristics. The body 12 may also include one or more internal features, such as ribs, fasteners, or the like to provide rigidity, mounting locations for internal components, and assembly features as needed for construction of the stylus 10, among others.

A control board 24, a transmitter 26 and a power source 28 are disposed within the body 12. The control board 24 comprises, for example, an integrated circuit board, a processor, a logic chip, a memory, and/or any other components useable to carry out the functions of the stylus 10 described below. The specific construction and makeup of the control board 24 is not germane to an understanding of embodiments of the invention described herein and, as such, are not described further.

The transmitter 26 is in electronic communication with the control board 24 and is configured to transmit signals 30 over the air from the control board 24 to a base unit 32 that is separate from the stylus 10. In an embodiment, the signals 30 are high-frequency audio or ultra-sound signals, such as audio signals on a frequency of about 18 kilohertz (kHz) or between about 13 and 23 kHz. In another embodiment, the signals 30 comprise radio frequency (RF) signals or microwave RF signals. In embodiments, the transmitter 26 includes an electronic transducer such as a speaker, a piezo element, or another electronic oscillator configured to produce the signals 30. In a further embodiment, transmitter 26 uses light transmission, such as infrared transmission, to transmit signals over the air to the base unit 32.

The base unit 32 comprises any computing device available in the art now or in the future that is configured to receive the signals 30 from the transmitter 26. The base unit 32 may include a variety of system configurations, including handheld devices, tablet devices, consumer electronics, general-purpose computers, more specialty computing devices, etc. The base unit 32 is a standalone computing device or is part of a distributed computing environment where tasks are performed by remote-processing devices that are linked through a communications network. Further detail on the configuration of the base unit 32 is not necessary for understanding embodiments of the invention. Such details are not discussed further so as not to obscure description of embodiments of the invention.

Embodiments of the stylus 12 include a power source 28 comprising one or more batteries disposed within the body 12. The power source 28 is electrically coupled to the control board 24 and to any other components of the stylus 10 that require electrical power.

The tip 14 is disposed at a first end 18 of the body 12. The tip 14 comprises any feature that is useable to contact a surface 20. In an embodiment, the tip 14 comprises a nib extending from the first end 18 of the body 12. In one embodiment, the tip 14 is separate from and is held by the body 12, while in other embodiments tip 14 can be integral with the body 12. A distal end 22 of the tip 14 may be rounded or otherwise configured to contact and slide across the surface 20 without damaging the surface 20. In an embodiment, the tip 14 is electrically conductive or includes an electrically conductive feature such that the tip 14 is useable to provide input to a surface 20 having a capacitive interface.

A pressure sensor 34 is associated with the tip 14 to detect a force applied to the tip 14. The pressure sensor 34 comprises any pressure sensing technology available in the art, such as capacitive sensors, piezoelectric sensors, electromagnetic sensors, and piezoresistive strain gauges, among others. In an embodiment, the pressure sensor 34 detects the application of a force on the tip 14, e.g. the pressure sensor 34 indicates whether or not a force is applied to the tip 14. In another embodiment, the pressure sensor 34 also provides an indication of the amount of force applied, e.g. the pressure sensor 34 indicates that a force of "x" Newtons is applied to the tip 14 or provides another value that can be converted to a force measurement.

The color selector 16 comprises one or more of a switch, rotary dial, button, or the like that is useable to manually select a desired color to be associated with inputs provided via the stylus 10. The color selector 16 is used to select from one or more discrete, predefined colors or might be useable to select a color from a spectrum of a plurality of colors, e.g. hundreds, thousands, or millions of colors. For example, in an embodiment, indications of a plurality of discrete, predefined colors are provided on the body 12 of the stylus 10, e.g. red, green, and blue. The color selector 16 is thus useable to select red, green, or blue. In another embodiment, a spectrum of colors is provided on the body 12 of the stylus 10. The color selector 16 is thus positionable along the spectrum to indicate a desired color. In an embodiment, the color selector 16 or an additional selection component (not shown) enables selection of a line style, line weight, or any other desired feature or characteristic.

In another embodiment, a color sensor 36 is provided in the stylus 10. The color sensor 36 is useable to pick up or sense a color of an object in the environment surrounding a portion of the stylus 10. In an embodiment, the color sensor 36 comprises a charge-coupled device (CCD) chip, a complimentary metal-oxide semiconductor (CMOS) chip, or other color sensing technology. As such, the color selector 16 may comprise a button or other component useable to indicate that a color sensed by the color sensor 36 is to be selected.

In an embodiment, the stylus 10 also includes a camera 38. The camera 38 is useable to capture one or more images as is known in the art. The camera 38 comprises any image capture technology available in the art. In an embodiment, the camera 38 also functions as the color sensor 36.

With continued reference to FIG. 1, the operation of the stylus 10 is described in accordance with an embodiment of the invention. Initially, the stylus 10 is powered on, such as by actuating a power switch (not shown) included on the body 12 of the stylus 10. An application, such as a drawing application, is initiated on the base unit 32.

A user manually selects a color to be associated with inputs from the stylus 10 using the color selector 16. In an embodiment, the color selector 16 comprises a dial that the user rotates to a location associated with a predefined color or to a location along a color spectrum provided about the dial on the body 12 of the stylus 10. In another embodiment, the color selector 16 comprises a sliding switch that is similarly aligned with a desired color. In yet another embodiment, the color selector 16 comprises a plurality of depressible buttons that are each associated with a different predefined color and are selectable by the user to indicate one of the predefined colors as a selected color. Other ways of manually selecting a color are available and are understood as falling within the scope of embodiments of the invention described herein.

In another embodiment, the color selector 16 includes a color sensor 36. The user thus points the color sensor 36 in the direction of an object that exhibits a desired color and instructs the color sensor 36 to pick up/sense the color by, for example, depressing a button on the stylus 10. The instruction to pick up the color may be provided directly to the color sensor 36 or may be provided to the color sensor 36 by way of the control board 24. The data associated with the picked up color is provided to the control board 24. In an embodiment, the control board 24 provides one or more processing steps on the color data and may identify a color indicated by the color data. The control board 24 transmits the raw, partially processed, and/or processed color data to the base unit 32 using the transmitter 26.

In embodiments, the transmission of the color data to the base unit 32 uses ultra-sonic or radio frequency signal transmissions. For example, in one embodiment, the transmission employs an on-off keying method that uses a single frequency. The on-off keying method may use encoding systems, such as Manchester or phase encoding. In another embodiment, the transmission employs two frequencies; a first frequency to indicate a logic "1" and a second frequency to indicate a logic "0." The transmissions might also be encoded in a plurality of orthogonal frequencies. In another embodiment, the transmission follows specifications promulgated by the Institute of Electrical and Electronics Engineers (IEEE) Local Area Network (LAN)/Metropolitan Area Network (MAN) Standards Committee. The IEEE specifications might include, for example, any known or future versions of IEEE 802.11a, 802.11g, 802.11n, and 802.15 (e.g. Bluetooth™), among others. In a further embodiment, the transmission employs a light transmission technology, such as infrared, to carry the color data to the base unit 32.

Continuing with the operation of the stylus 10, the tip 14 of the stylus 10 is placed in contact with the surface 20. As a result of this contact, a force is applied to the tip 14 and is sensed by the pressure sensor 34. In an embodiment, the pressure sensor 34 senses an amount of force applied to the tip 14. The sensed force data is provided to the control board 24. The control board 24 transmits the raw force data to the base unit 32 via the transmitter 26 and/or provides one or more processing steps on the force data before transmitting to the base unit 32. The transmissions are carried out similarly to those described previously for the color data.

The base unit 32 receives both the color data and the force data. In an embodiment, the base unit 32 provides all processing of the raw color data and force data. As such, the base unit 32 determines the color indicated by the color data and determines an amount of force indicated by the force data. For example, the raw force data might comprise an electrical resistance value or change therein measured by the pressure sensor 34 which the base unit 32 correlates to a table to determine a corresponding force. In another embodiment, the base unit 32 receives the color data and the force data in a processed or partially processed form. The base unit 32 may then complete any additional processing.

The base unit 32 employs the processed color and force data to inform the application executing thereon. For example, when the base unit 32 is executing a drawing program, the color data instructs the color to be applied to a line 40 drawn by the stylus 10. Further, the force data instructs the weight of the line 40 drawn by the stylus 10, e.g. the greater the force, the wider the line 40. It is to be understood that the color and force data might be employed to instruct other characteristics of inputs provided by the stylus. For example, the force data might indicate a transparency to be associated with a line, e.g. the greater the force, the darker or more opaque the line.

In an embodiment, the base unit 32 comprises a tablet computer having a display device with an overlying capacitive input interface as is available in the art. The stylus 10 is used to provide input to the capacitive input interface. As such, the stylus 10 can be used to interact with applications displayed on the tablet computer's display device. For example, the stylus 10 might be used to draw or create artwork within a drawing application executed by the tablet computer.

In another embodiment, the base unit 32 includes a computing device with an associated capacitive or pressure sensitive touch interface. The stylus 10 can be used to provide inputs via the touch interface and those inputs used to instruct the base unit 32 to generate associated outputs to an associated display device.

In another embodiment, the stylus 10 includes the camera 38. As such, an image is captured by pointing the camera 38 in the direction of a desired subject and instructing the capture of an image, such as by depressing a button on the body 12 of the stylus 10. The image data is transmitted in raw, partially processed, and/or processed form by the control board 24 to the base unit 32 using the transmitter 26 as described previously.

The camera 38 might also be useable to aid in locating the stylus 10 with respect to the surface 20. In an embodiment, the surface 20 comprises a sheet of paper, plastic, or similar material that is preprinted with features that are detectable by the camera 38. The features are useable to determine a location of the stylus 10 on the surface 20. For example, the features might comprise a series of dots or grid patterns that are varied across the length and width of the surface 20 such that the images of the surface 20 captured by the camera 38 are useable to identify a location based thereon. In another embodiment, the surface 20 overlies a display device of the base unit 32 and the location of the stylus 10 is determined based on images of the pixels of the display device provided by the camera 32, among other methods. In such embodiments, the camera 38 continuously or regularly captures images that are transmitted to the base unit 32.

Many different arrangements of the various components depicted, as well as components not shown, are possible without departing from the scope of the claims below. Embodiments of the technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A stylus comprising:
a stylus body;
a tip extending from an end of the stylus body, wherein the tip is integral with the stylus body;
a style selection component configured to receive a selection of a line style associated with inputs of the stylus, wherein the style selection component is integral with the stylus body;
a pressure sensor configured to provide pressure data comprising an amount of a pressure applied to the tip;
a color sensor configured to provide color data comprising a color in proximity to the tip, wherein the color sensor comprises a camera configured to capture an image;
a color selector for receiving from a user a color selection that is to be associated with inputs of the stylus, wherein the color selector comprises a rotary encoder that enables manual color selection from a color spectrum provided around a body of the rotary encoder, the color spectrum comprising discrete predefined colors;
a processor configured to receive and process the pressure data, the color data, and the color selection; and
a transmitter configured to transmit the processed pressure data, the processed color data, and the processed color selection, using one or more of high-frequency audio signals or radio frequency signals, to a base unit comprising a computing device having a receiver.

2. The stylus of claim 1, wherein the tip is conductive and is useable with a capacitive surface.

3. The stylus of claim 1, wherein the color sensor is useable to identify an object color in an environment in proximity to the stylus.

4. The stylus of claim 1, wherein the transmitter transmits the processed pressure data, the processed color data, and the processed color selection at a frequency between 13 and 23 kilohertz.

5. The stylus of claim 1, wherein the processor transmits the processed pressure data, the processed color data, and the processed color selection using an on-off keying method.

6. The stylus of claim 5, wherein a Manchester encoding method is used.

7. The stylus of claim 1, wherein the transmitter transmits the processed pressure data, the processed color data, and the processed color selection using at least two frequencies, the at least two frequencies comprising a first frequency for transmitting a first logic value and a second frequency for transmitting a second logic value.

8. The stylus of claim 1, wherein the transmitter transmits the processed pressure data, the processed color data, and the processed color selection encoded in a plurality of orthogonal frequencies.

9. The stylus of claim 1, wherein the transmitter is configured to transmit the processed pressure data, the processed color data, and the processed color selection based on one or more of IEEE specifications 802.15, 802.11a, 802.11g, or 802.11n.

10. The stylus of claim 1, wherein the transmitter includes one or more of a speaker or a piezo element.

11. The stylus of claim 1, wherein the base unit is a tablet computing device.

12. The stylus of claim 1, wherein the stylus is used in conjunction with a drawing application executing on the base unit, and wherein the pressure sensed by the pressure sensor is used to determine a width of a line drawn in the drawing application and a degree of transparency of the line drawn in the drawing application.

13. A stylus comprising:
a stylus body;
a tip;
a pressure sensor configured to provide data comprising an amount of pressure applied to the tip;
a color sensor configured to provide data comprising a color in proximity to the tip, wherein the color sensor comprises a camera configured to capture an image;
a color selection component for receiving a color selection that is to be associated with inputs of the stylus, wherein the color selection component comprises a rotary encoder that enables manual color selection from a color spectrum provided around a body of the rotary encoder, the color spectrum comprising discrete predefined colors;
a style selection component configured to receive a selection of a line style associated with inputs of the stylus wherein the style selection component is integral with the stylus body;
a processor configured to receive and process the data from one or more of the pressure sensor, the color sensor, the color selection component, or the style selection component, wherein the data comprises one or more of the amount of pressure, the color in proximity to the tip, the color selection, or the selection of the line style; and
a transmitter configured to transmit the processed data over the air to a base unit comprising a computing device having a receiver.

14. The stylus of claim 13, wherein transmitting the processed data over the air comprises transmitting the data using one or more of high-frequency audio signals or ultra-sound signals.

15. The stylus of claim 13, wherein transmitting the processed data over the air comprises transmitting the processed data using one or more of radio frequency (RF) signals or microwave RF signals.

16. The stylus of claim 13, wherein the stylus is used in conjunction with a drawing application executing on the base unit such that the processed data transmitted over the air to the base unit is used to interact with the drawing application.

17. A stylus comprising:
a stylus body;
a tip;
a pressure sensor configured to provide data comprising an amount of pressure applied to the tip;
a color sensor configured to provide data comprising a color in proximity to the tip, wherein the color sensor comprises a camera configured to capture an image;
a color selector for receiving from a user a color selection that is to be associated with inputs of the stylus, wherein the color selector comprises a rotary encoder that enables manual color selection from a color spectrum provided around a body of the rotary encoder, the color spectrum comprising discrete predefined colors;
a processor configured to receive and process data from one or more of the pressure sensor, the color sensor, or the color selector, wherein the data comprises one or more of the amount of pressure, the color in proximity to the tip, or the color selection; and
a transmitter configured to transmit the processed data using high-frequency audio signals to a base unit comprising a computing device having a receiver.

18. The stylus of claim 17, wherein the stylus is used in conjunction with a drawing application executing on the base unit, and wherein the transmitted data is used to determine at least one of the following with respect to the drawing application:
a width of a line drawn in the drawing application based on the amount of pressure sensed by the pressure sensor; and
an object color for an object drawn in the drawing application based on one or more of the color sensed in proximity to the tip or the color selection.

* * * * *